(12) United States Patent
Estenne et al.

(10) Patent No.: US 9,108,467 B2
(45) Date of Patent: Aug. 18, 2015

(54) CROWN REINFORCEMENT FOR AIRCRAFT TIRE

(75) Inventors: Vincent Estenne, Clermont-Ferrand Cedex (FR); Laurent Bucher, Clermont-Ferrand Cedex (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 216 days.

(21) Appl. No.: 13/808,696

(22) PCT Filed: Jul. 5, 2011

(86) PCT No.: PCT/EP2011/061270
§ 371 (c)(1),
(2), (4) Date: Mar. 14, 2013

(87) PCT Pub. No.: WO2012/004237
PCT Pub. Date: Jan. 12, 2012

(65) Prior Publication Data
US 2013/0199689 A1    Aug. 8, 2013

(30) Foreign Application Priority Data
Jul. 7, 2010   (FR) ..................................... 10 55494

(51) Int. Cl.
*B60C 9/18*     (2006.01)
*B60C 19/08*    (2006.01)
*B60C 23/19*    (2006.01)
*B60C 9/22*     (2006.01)

(52) U.S. Cl.
CPC ................. *B60C 9/1807* (2013.04); *B60C 9/18* (2013.01); *B60C 9/22* (2013.01); *B60C 23/19* (2013.01); *B60C 2200/02* (2013.04); *Y10T 152/10765* (2015.01); *Y10T 428/24132* (2015.01)

(58) Field of Classification Search
CPC ........ B60C 9/18; B60C 19/08; B60C 19/082; B60C 2009/1828; B60C 2200/02
See application file for complete search history.

(56) References Cited

U.S. PATENT DOCUMENTS

| | | |
|---|---|---|
| 2,423,995 A | 7/1947 | Reynolds |
| 3,515,195 A | 6/1970 | Sperberg |

(Continued)

FOREIGN PATENT DOCUMENTS

| | | |
|---|---|---|
| DE | 20 2004 011 400 | 11/2004 |
| DE | 10 2007 049 872 | 4/2009 |

(Continued)

*Primary Examiner* — Justin Fischer
(74) *Attorney, Agent, or Firm* — Cozen O'Connor

(57) ABSTRACT

An improvement in an airplane tire to obtain a more even distribution of temperature within the crown of the tire. An airplane tire comprises a crown reinforced by a working reinforcement (3), comprising at least one layer of working reinforcement (30) made up of axially juxtaposed substantially circumferential strips (31) made up of mutually parallel textile reinforcing elements (32) coated with a polymer coating material (33). Each strip is in contact, over at least its radially inner axial face, with a heat transfer element (34) comprising at least one heat-conducting material with thermal conductivity at least equal to 50 times the thermal conductivity of the polymer coating material. The product of the thickness of a heat transfer element by the tension modulus of a heat transfer element is at most equal to 0.3 times the product of the thickness of the strip by the tension modulus of the strip.

13 Claims, 2 Drawing Sheets

(56) References Cited

U.S. PATENT DOCUMENTS 6,401,779 B1 6/2002 Riva et al.
2007/0235116 A1 10/2007 Roget et al.

FOREIGN PATENT DOCUMENTS

FR 2 730 456 8/1996
GB 1346006 * 2/1974

* cited by examiner

CROWN REINFORCEMENT FOR AIRCRAFT TIRE

RELATED APPLICATIONS

This is a U.S. National Phase Application under 35 USC 371 of International Application PCT/EP2011/061270 filed on Jul. 5, 2011.

This application claims the priority of French application Ser. No. 10/55494 filed Jul. 7, 2010, the entire content of which is hereby incorporated by reference.

FIELD OF THE INVENTION

The present invention relates to an airplane tire and, in particular, to the crown reinforcement of an airplane tire comprising layers of textile reinforcing elements.

BACKGROUND OF THE INVENTION

Since a tire has a geometry that exhibits symmetry of revolution about an axis of rotation, the geometry of the tire can be described in a meridian plane containing the axis of rotation of the tire. For a given meridian plane, the radial, axial and circumferential directions respectively denote the directions perpendicular to the axis of rotation of the tire, parallel to the axis of rotation of the tire, and perpendicular to the meridian plane. In what follows, the expressions "radially on the inside" and "radially on the outside" respectively mean "closer to the axis of rotation of the tire in the radial direction" and "further away from the axis of rotation of the tire, in the radial direction". The expressions "axially on the inside" and "axially on the outside" respectively mean "closer to the equatorial plane, in the axial direction" and "further away from the equatorial plane, in the axial direction", the equatorial plane being the plane perpendicular to the axis of rotation of the tire and passing through the middle of the tread surface of the tire.

An airplane tire is characterized by a nominal pressure in excess of 9 bar and a nominal level of deflection greater than or equal to 32%. The nominal pressure is the nominal inflation pressure of the tire as defined, for example, by the standards laid down by the Tire and Rim Association or TRA. The nominal level of deflection of a tire is, by definition, its radial deformation, or variation in radial height, when it changes from an unladen inflated state to a statically loaded inflated state under nominal load and pressure conditions as defined, for example, by the TRA standard. It is expressed in the form of a relative deflection, defined by the ratio of this variation in radial height of the tire to half the difference between the outside diameter of the tire and the maximum diameter of the rim measured on the rim flange. The outside diameter of the tire is measured under static conditions in an unladen state inflated to the nominal pressure.

A tire in general comprises a crown comprising a tread intended to come into contact with the ground via a tread surface, two beads intended to come into contact with a rim and two sidewalls connecting the crown to the beads. A radial tire, such as is generally used on an airplane, more specifically comprises a radial carcass reinforcement and a crown reinforcement both as described, for example, in document EP1381525.

The radial carcass reinforcement is the tire reinforcing structure that connects the two beads of the tire. The radial carcass reinforcement of an airplane tire generally comprises at least one layer of carcass reinforcement, each layer of carcass reinforcement being made up of mutually parallel reinforcing elements, usually textile, making an angle of between 80° and 100° with the circumferential direction.

The crown reinforcement is the tire reinforcing structure radially on the inside of the tread and at least partially radially on the outside of the radial carcass reinforcement. The crown reinforcement of an airplane tire generally comprises at least one layer of crown reinforcement, each layer of crown reinforcement being made up of mutually parallel reinforcing elements coated in a polymer coating material. Within the layers of crown reinforcement, a distinction is made between the layers of working reinforcement that make up the working reinforcement, usually made up of textile reinforcing elements, and the layers of protective reinforcement that make up the protective reinforcement and are made of metallic or textile reinforcing elements positioned radially on the outside of the working reinforcement.

During the manufacture of an airplane tire, a layer of working reinforcement is usually created by a zigzag winding or winding in turns of strips made up of textile reinforcing elements; around a cylindrical manufacturing device by performing an axial translational movement of the strip for each turn of winding so as to obtain the expected axial width of layer of working reinforcement. The layer of working reinforcement is thus made up of axially juxtaposed strips. What is meant by zigzag winding is a winding in a curve formed of undulations that are periodic, either over half a period per turn of winding or over one period per turn of winding, the angle of the textile reinforcing elements of the strips generally being comprised between 8° and 30° with respect to the circumferential direction. For a layer of working reinforcement that is created by winding in turns, the angle of the textile reinforcing elements of the strips is generally comprised between 0° and 8° with respect to the circumferential direction. Whatever the type of winding of the strips, the angle of the textile reinforcing elements of the strips is generally less than 30° with respect to the circumferential direction. For this reason, the strips and the resulting working layer are said to be substantially circumferential, which means substantially circumferential in direction with undulations of limited amplitude about the circumferential direction.

The reinforcing elements of the layers of working reinforcement are mutually parallel, which means to say that the distance between the geometric curves of two adjacent reinforcing elements is constant, it being possible for the geometric curves to exhibit periodic undulations.

The reinforcing elements of the layers of carcass reinforcement and of the layers of working reinforcement, for airplane tires, are usually cords made up of spun yarns of textile filaments, preferably made of aliphatic polyamides or aromatic polyamides. The reinforcing elements of the layers of protective reinforcement may be either cords made up of metallic threads, or cords made up of spun yarns of textile filaments.

The mechanical properties under tension (modulus, elongation and force on rupture) of the textile reinforcing elements are measured after prior conditioning. What is meant by "prior conditioning" is that the textile reinforcing elements are stored for at least 24 hours, prior to measuring, in a standard atmosphere in accordance with European standard DIN EN 20139 (a temperature of 20±2° C.; a relative humidity of 65±2%). The measurements are taken in a known way using a tensile test machine made by ZWICK GmbH & Co (Germany) of type 1435 or type 1445. The textile reinforcing elements are subjected to tension on an initial length of 400 mm at a nominal rate of 200 mm/min. All the results are averaged over 10 measurements.

A polymer material, such as the polymer coating material used for the textile reinforcing elements of the layers of working reinforcement is mechanically characterized, after curing, by tensile stress—strain properties that are determined by tensile testing. This tensile testing is performed, on a test specimen, using a method known to those skilled in the art, for example in accordance with International Standard ISO 37, and under normal temperature (23+ or −2° C.) and humidity (50+ or −5% relative humidity) conditions defined by International Standard ISO 471. For a polymer mixture, the tensile stress measured for a 10% elongation of the test specimen is known as the elasticity modulus or tension modulus at 10% elongation and is expressed in megapascals (MPa).

In use, the mechanical stresses of running, resulting from the combined action of the nominal pressure, of the load applied to the tire which may vary between 0 and 2 times the nominal load, and of the speed of the airplane, introduce tension cycles into the reinforcing elements of the layers of working reinforcement.

These tension cycles generate, within the polymer coating material of the reinforcing elements of the layers of working reinforcement, sources of heat, particularly at the axial ends of the layers of working reinforcement. These sources of heat are localized hot spots where the removal of heat is difficult, because the heat has to be able to spread either through the polymer coating material or through the textile reinforcing elements. However, the polymer coating material, because of its low thermal conductivity, is a poor conductor of heat. Likewise, the textile reinforcing elements, because of their low thermal conductivity, cannot make an effective contribution towards the removal of heat. This results in excessive heating of the polymer coating material, which is prejudicial to its correct mechanical integrity and is likely to cause it to degrade, thus leading to premature tire failure.

Various technical solutions have been conceived of in an attempt to create a path for the removal of the heat generated in the working reinforcement. Documents EP1031441 and JP2007131282 disclose thermally conducting polymer materials with improved thermal conductivity. Document EP1548057 proposes polymer materials that include carbon nanotubes to increase the thermal conductivity. Document EP1483122 describes a thermal drain, in the form of metallic cables laid in a meridian plane and inserted at the end of the working reinforcement. Finally, document KR812810 proposes a thermally conducting insert, which may be metallic and is arranged at the end of the working reinforcement.

SUMMARY OF THE INVENTION

One object of the invention is to improve removal of the heat generated in the working reinforcement of an airplane tire, from the hottest points, which are generally located at the ends of the layers of working reinforcement, to the points that are the least hot, generally located in the central region of the working reinforcement, so as to obtain a more even temperature distribution across the crown of the tire, while at the same time minimizing the impact this has on the mechanical loadings of the working reinforcement.

This and other objects are attained in accordance with one aspect of the present invention directed to an airplane tire comprising:

a crown intended to come into contact with the ground via a tread and connected by two sidewalls to two beads intended to come into contact with a rim, a radial carcass reinforcement connecting the two beads, a crown reinforcement, radially on the inside of the tread and radially on the outside of the radial carcass reinforcement, comprising a working reinforcement and a protective reinforcement, the working reinforcement, radially on the inside of the protective reinforcement, comprising at least one layer of working reinforcement, each layer of working reinforcement consisting of axially juxtaposed substantially circumferential strips, each strip being made up of mutually parallel textile reinforcing elements coated with a polymer coating material, each strip of at least one layer of working reinforcement being in contact, over at least its radially inner axial face, with a heat transfer element comprising at least one heat-conducting material, the thermal conductivity of a heat-conducting material of a heat transfer element being at least equal to 50 times the thermal conductivity of the polymer coating material of the textile reinforcing elements of the strip in contact with the heat transfer element, the product of the thickness of a heat transfer element by the tension modulus of a heat transfer element is at most equal to 0.3 times the product of the thickness of the strip by the tension modulus of the strip.

According to an embodiment of the invention, each strip of at least one layer of working reinforcement is advantageously in contact with a heat transfer element, over at least its radially inner axial face, which means that face of the strip that is parallel to the axis of rotation of the tire and radially closest to the axis of rotation of the tire.

A heat transfer element performs a function of removing heat thanks to the presence of at least one heat-conducting material. The heat transfer element is not necessarily made up exclusively of heat-conducting materials.

What is meant by a heat-conducting material is a material the thermal conductivity of which is high, such as, for example, a metallic material. The thermal conductivity of a material is a physical quantity, expressed in $W \cdot m^{-1} \cdot K^{-1}$, that characterizes the ability of a material to carry heat energy. The higher the thermal conductivity of a heat-conducting material, the better it is at transporting heat energy.

By contrast, a material that is not a conductor of heat or, more precisely, that is a poor conductor of heat, means a material the thermal conductivity of which is low, for example such as a conventional polymer material conventionally used in a tire.

The heat or heat energy generated at an axial end of the layer of working reinforcement is removed by the heat transfer element in contact with the strip situated at the axial end of the layer of working reinforcement, and is then transmitted progressively, axially inwards, to the heat-transfer elements in contact with the axially innermost and axially juxtaposed strips. Because the strips are oriented substantially circumferentially, the respective heat transfer elements in contact with the said strips will circumferentially distribute the heat generated at the axial ends of the layer of working reinforcement. Thus, the heat generated at the axial ends of the layer of working reinforcement is removed by the heat transfer elements respectively in contact with the juxtaposed strips both axially and circumferentially, thereby evening out the temperatures both in the axial width of the layer of working reinforcement, between its axial ends and its central part, and over the circumference of the layer of working reinforcement.

This heat transfer, the purpose of which is to even out the temperatures between the axial ends and the centre of the layer of working reinforcement is possible because the temperatures are higher between the axial ends and the centre of the layer of working reinforcement, hence creating a temperature gradient that drives the conduction of heat.

In order for the heat energy to be removed for preference by the heat transfer elements in contact with the strips that make up a layer of working reinforcement, the thermal conductivity of a heat-conducting material of a heat transfer element needs to be significantly higher than that of the polymer coating material with which the textile reinforcing elements of the strip in contact with the heat transfer element are coated, the polymer coating material being, by nature, a poor conductor of heat. The inventors have demonstrated that a thermal conductivity of a heat-conducting material that is at least equal to 50 times that of the polymer coating material that coats the textile reinforcing elements of the strip in contact with the heat transfer element would allow a sufficient amount of heat energy to be removed that the level of heat at the axial end of the layer of working reinforcement can be reduced to an acceptable level, i.e. a level that is not likely to degrade the materials concerned.

Again according to an embodiment of the invention, the product of the thickness of a heat transfer element by the tension modulus of a heat transfer element is at most equal to 0.3 times the product of the thickness of the strip by the tension modulus of the strip.

The tension modulus is defined as being the gradient of the straight line tangential to the tension curve, defining the tensile force as a function of the elongation at the point on the tension curve that corresponds to a tensile force of 50 daN.

This feature makes it possible to limit the contribution that the heat transfer element makes towards the overall circumferential tensile rigidity of the assembly of the strip and of the heat transfer element. In other words, the presence of the heat transfer element has a limited impact on the mechanical stresses to which the strip is subjected.

Specifically, calculating the product of the thickness, of the tension modulus and of the elongation of the strip, gives the circumferential load per unit axial width of the strip. Similarly, calculating the product of the thickness, of the tension modulus and of the elongation of the heat transfer unit gives the circumferential load per unit axial width of the heat transfer element. Because the elongations of the strip and of the heat transfer element are the same, this means that the circumferential load per unit axial width, or distributed tension, of the heat transfer element is thus at most equal to 0.3 times the circumferential load per unit axial width of the strip in contact with the heat transfer element. In other words, the mechanical contribution made by the heat transfer element thus remains limited to 30% of that of the strip in reacting circumferential load.

Advantageously, each strip of each layer of working reinforcement is in contact, over at least its radially inner axial face, with a heat transfer element comprising at least one heat-conducting material. The heat generated at the axial ends of each of the layers of working reinforcement, and not only the heat generated at the axial ends that have the highest temperatures, is advantageously removed so as to even out the temperatures in each layer of working reinforcement and therefore throughout the thickness of the radial reinforcement.

Advantageously also, a heat transfer element is made up of at least one substantially circumferential band. A metal band is an element that extends around the entire periphery of a strip and has a rectangular meridian section, of which the shortest dimension in a meridian plane is directed radially and of which the longest dimension in a meridian plane is directed axially. A metal band is made of a metallic material. A substantially circumferential band follows the substantially circumferential path of the strip with which it is in contact.

A first preferred embodiment is to have a heat transfer element made up of a single substantially circumferential metal band of which the axial width is equal to the axial width of the strip in contact with the heat transfer element. Such an embodiment in which the axial width of the single substantially circumferential metal band is equal to the axial width of the strip is advantageous in terms of the manufacture of the tire because the strip and the single substantially circumferential metal band can be assembled beforehand at the elementary level of the strip, then the assembly thus created of the strip and of the single substantially circumferential metal band can be wound onto the cylindrical device used to create the layer of working reinforcement. Further, the continuity of the conduction of heat in the circumferential and axial directions is afforded by the continuity of each single substantially circumferential metallic band and by the spiroidal or zigzag circumferential winding of the strip. Thus, this embodiment allows optimal removal of the heat generated at the ends of the layer of working reinforcement both in the axial direction and in the circumferential direction.

According to a second embodiment of the invention, a heat transfer element is made up of a plurality of axially juxtaposed substantially circumferential metal bands, of which the sum of the axial widths is at most equal to the axial width of the strip in contact with the heat transfer element. This embodiment is equivalent, in terms of heat conduction, to the previous embodiment with the single substantially circumferential metal band. Furthermore, a juxtaposition of elementary substantially circumferential metal bands advantageously exhibits a flexural rigidity about a radial direction that is lower than a single substantially circumferential metal band, which means that it has less of an impact on the flexural rigidity about a radial direction of the strip and therefore on the flexural rigidity about a radial direction of the layer of working reinforcement: hence the introduction of the heat transfer elements has less of an impact on the mechanical behaviour of the working reinforcement.

A third embodiment of the invention is characterized by a heat transfer element made up of a plurality of axially disjointed substantially circumferential metal bands, distributed over the axial width of the strip in contact with the heat transfer element. In this embodiment, a heat transfer element is thus made up of a plurality of substantially circumferential metal bands disjointed one from the next in pairs in the axial direction: this means that the sum of the axial widths of the substantially circumferential metal bands is less than the axial width of the strip with which the substantially circumferential metal bands are in contact. Because of this geometric discontinuity between the substantially circumferential metal bands, the conduction of heat is not performed continuously in the axial direction but is afforded continuously in the circumferential direction. However, such an embodiment makes it possible for the heat transfer element, made up of disjointed substantially circumferential metal bands, to have rigidities which are lower than those of a heat transfer element made up of a single substantially circumferential metal band. As in the second embodiment, the flexural rigidity in a radial direction of a plurality of substantially circumferential metal bands which are disjointed one from the next in pairs is lower than the flexural rigidity in a radial direction of a single substantially circumferential metal band. In addition, the circumferential tensile rigidity of the heat transfer element in this embodiment makes only a small contribution to the circumferential tensile rigidity of the assembly of the strip and of the heat transfer element and this makes for easier winding of the assembly of the strip and of the heat transfer element around the cylindrical device when the layer of working reinforcement is being manufactured.

According to one optional feature of the invention, a substantially circumferential metal band advantageously comprises holes. Whether the heat transfer element is made up of a single substantially cylindrical metal band or of a plurality of axially juxtaposed or disjointed substantially circumferential metal bands, the holes pierced in each substantially circumferential metal band promote better adhesion between the two strips respectively radially on the outside and radially on the inside of the metal band via direct contact, through the holes, between the respective polymer coating materials of the two strips.

According to another optional feature of the invention, a substantially circumferential metal band comprises circular holes. Aside from the advantage already mentioned in terms of the circumferential tensile rigidity of the assembly of the strip and of the heat transfer element, making holes that are circular, for example by punching, is easy from an industrial standpoint.

A substantially circumferential metal band advantageously comprises holes of a diameter at most equal to the axial half-width of the band because the cross section of the holes in the metal band has to be limited in order for it to be effective at conducting heat.

A heat-conducting material of a heat transfer element is more advantageously still metallic. A metallic material, such as, for example, aluminium, has a thermal conductivity of around 200 $W \cdot m^{-1} \cdot K^{-1}$, whereas a polymer material has a thermal conductivity of around 0.3 $W \cdot m^{-1} \cdot K^{-1}$.

For preference, a heat-conducting material of a heat transfer element is aluminium characterized by a high thermal conductivity and a low density. Aluminium requires an interface coating to cause it to adhere to the polymer coating material of the strip in contact; there are various techniques available for achieving this: a coating of the brass type, of organic type (silane or amino-silane), epoxy or commercial adhesives.

A heat transfer element made up of one or several substantially circumferential metal bands made of aluminium advantageously has a constant thickness at most equal to 0.1 mm so as to limit the circumferential tensile rigidity of the heat transfer element.

Finally, it is advantageous for any heat transfer element to have, about its entire circumference, periodic geometric oscillations in a circumferential plane perpendicular to the axial direction. These periodic geometric oscillations may, non-exhaustively, be alternating V-shaped bends or undulations of sinusoidal shape. The presence of periodic geometric oscillations increases the circumferential extensibility of the heat transfer element and therefore reduces the risk of a tensile rupture of the heat transfer element.

Advantageously, the ratio between the peak-to-peak amplitude of the periodic geometric oscillations and the wavelength of the period is greater than 0.05 in order to give the heat transfer element satisfactory circumferential extensibility.

Another aspect of the invention is relates to a metalized strip, comprising a strip made up of mutually parallel textile reinforcing elements coated in a polymer coating material, the strip being in contact, over at least its radially inner axial face, with a heat transfer element comprising at least one heat-conducting material, the thermal conductivity of a heat-conducting material of a heat transfer element being at least equal to 50 times the thermal conductivity of the polymer coating material of the textile reinforcing elements of the strip in contact with the heat transfer element, and the product of the thickness of a heat transfer element by the tension modulus of a heat transfer element is at most equal to 0.3 times the product of the thickness of the strip by the tension modulus of the strip.

The metalized strip as described hereinabove can be used in a tire according to an embodiment of the invention.

Another aspect of the invention is a metalized strip exhibiting all the above-mentioned features for the tire according to an embodiment of the invention.

BRIEF DESCRIPTION OF THE DRAWINGS

The features and other advantages of the invention will be better understood with the aid of attached FIGS. 1 to 5.

In order to make the invention easier to understand, FIGS. 1 to 5 have not been drawn to scale.

DETAILED DESCRIPTION OF THE DRAWINGS

Figure 1:
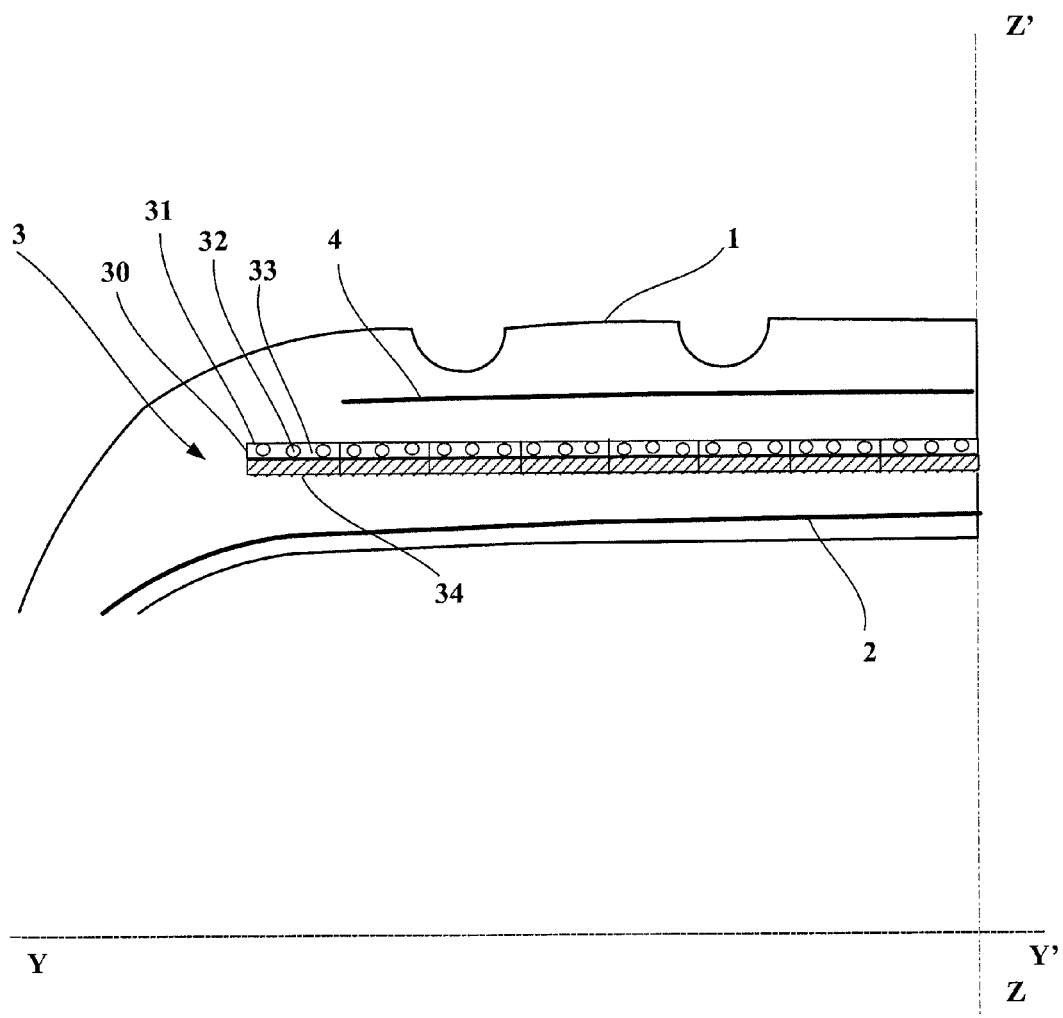
FIG. 1 shows a meridian cross section of a tire crown according to an embodiment of the invention, in particular schematically depicting the strips of a layer of working reinforcement and the corresponding substantially circumferential bands of heat transfer element.

FIG. 1 shows a meridian cross section, which means a cross section in a meridian plane, of the crown of a tire according to the invention. It depicts a crown intended to come into contact with the ground via a tread 1, the radial carcass reinforcement 2, the crown reinforcement, radially on the inside of the tread and radially on the outside of the radial carcass reinforcement, comprising a working reinforcement 3 and a protective reinforcement 4. The working reinforcement 3, made up of a superposition of layers of working reinforcement, is not depicted in full: just one layer of working reinforcement 30 has been depicted in order to make the invention easier to understand. The layer of working reinforcement is made up of axially juxtaposed substantially circumferential strips 31. Each strip is made up of mutually parallel textile reinforcing elements 32 coated with a polymer coating material 33. Each strip is in contact, on its radially inner axial face, with a heat transfer element 34.

Figure 2:
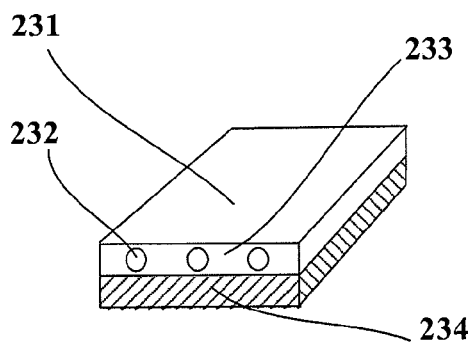
FIG. 2 is a diagram of the assembly of a strip of layer of working reinforcement and of a heat transfer element according to a first embodiment of the invention.

FIG. 2 is a diagram of the assembly of a strip 231 of layer of working reinforcement and of a heat transfer element 234, according to a first embodiment of the invention. The strip, made up of mutually parallel textile reinforcing elements 232 coated with a polymer coating material 233, is in contact, on its radially inner axial face, with a heat transfer element 234 made of a single substantially circumferential metal band of which the axial width is equal to the axial width of the strip 231 in contact.

Figure 3:
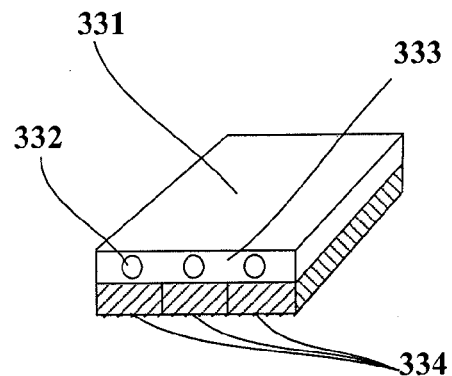
FIG. 3 is a diagram of the assembly of a strip of layer of working reinforcement and of a heat transfer element according to a second embodiment of the invention.

FIG. 3 is a diagram of the assembly of a strip 331 of layer of working reinforcement and of a heat transfer element 334, according to a second embodiment of the invention. The strip 331, made up of mutually parallel textile reinforcing elements 332 coated with a polymer coating material 333 is in contact, over its radially inner axial face, with a heat transfer element 334 made up of a plurality of axially juxtaposed substantially circumferential metal bands of which the total axial width, which is the sum of the axial widths of each of the substantially circumferential metal bands, is equal to the axial width of the strip 331 in contact.

Figure 4:
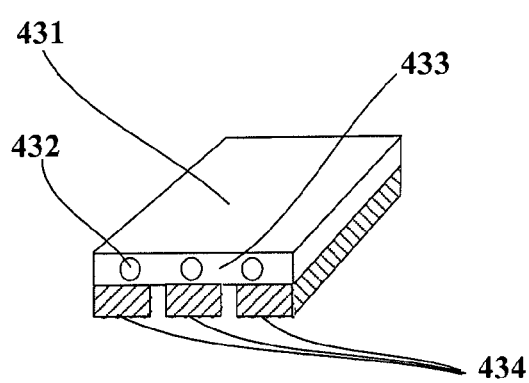
FIG. 4 is a diagram of the assembly of a strip of layer of working reinforcement and of a heat transfer element according to a third embodiment of the invention.

FIG. 4 is a diagram of the assembly of a strip 431 of layer of working reinforcement and of a heat transfer element 434 according to a third embodiment of the invention. The strip, made up of mutually parallel textile reinforcing elements 432 coated with a polymer coating material 433 is in contact, over its radially inner axial face, with a heat transfer element 434 made up of a plurality of axially disjointed substantially circumferential metal bands distributed over the axial width of the strip 431 in contact.

Figure 5:
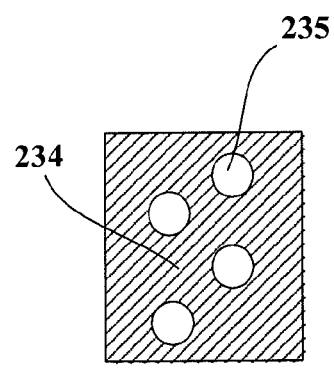
FIG. 5 is a diagram of an alternative form of heat transfer element.

Finally, FIG. 5 depicts a heat transfer element 234 made up of a single substantially circumferential metal band comprising circular holes 235.

The inventors carried out the invention according to the first embodiment thereof for an aircraft tire of size 46x17R20, the use of which is characterized by a nominal pressure of 15.9 bar, a nominal static load of 20473 daN and a maximum reference speed of 225 km/h. The working crown reinforcement of this tire comprises 9 layers of working reinforcement, which are made up of substantially circumferential strips, three of them being laid in turns which are juxtaposed in the axial direction, and 6 of them being wound in a zigzag, with one period per turn of winding, the maximum angle of the textile reinforcing elements of the strips being equal to 11° with respect to the circumferential direction. Each strip is made up of reinforcing elements of hybrid type, i.e. made up of a combination of spun yarns of filaments of aromatic polyamides and spun yarns of filaments of aliphatic polyamides, coated with a polymer coating material the thermal conductivity of which is equal to 0.3 $W \cdot m^{-1} \cdot K^{-1}$. Each substantially circumferential strip is in contact, on its radially inner face, with a heat transfer element made up of a metal band made of aluminium 0.02 mm thick and with a thermal conductivity of 237 $W \cdot m^{-1} \cdot K^{-1}$. The thermal conductivity of the aluminium of which a heat transfer element is made is equal to around 600 times the thermal conductivity of the polymer coating material of the textile reinforcing elements of the strip in contact with the heat transfer element.

The inventors used finite-element numerical simulation on a tire running steadily at a speed of 10 km/h, under a nominal static load of 20.5 tonnes and a nominal pressure of 15.9 bar to demonstrate that the difference in temperatures between the axial end and the central part, in the vicinity of the equatorial plane, of the most heavily thermally loaded layer of working reinforcement drops from 90.5° C. to 78.5° C. when moving from the reference tire, which has strips with no heat transfer element, to the tire according to the invention. In the example chosen, the invention thus allows a 12° C. reduction in the maximum temperature at the end of the crown reinforcement.

The invention claimed is:

1. An airplane tire comprising:
   a crown adapted to come into contact with the ground via a tread and connected by two sidewalls to two beads intended to come into contact with a rim;
   a radial carcass reinforcement connecting the two beads;
   a crown reinforcement, radially on the inside of the tread and radially on the outside of the radial carcass reinforcement, comprising a working reinforcement and a protective reinforcement;
   the working reinforcement, radially on the inside of the protective reinforcement, comprising at least one layer of working reinforcement;
   each layer of working reinforcement comprising axially juxtaposed substantially circumferential strips;
   each strip being made up of mutually parallel textile reinforcing elements coated with a polymer coating material;
   each strip of at least one layer of working reinforcement is in contact, over at least its radially inner axial face, with a heat transfer element comprising at least one heat-conducting material, wherein the thermal conductivity of a heat-conducting material of a heat transfer element is at least equal to 50 times the thermal conductivity of the polymer coating material of the textile reinforcing elements of the strip in contact with the heat transfer element, and wherein the product of the thickness of a heat transfer element by the tension modulus of a heat transfer element is at most equal to 0.3 times the product of the thickness of the strip by the tension modulus of the strip.

2. The tire according to claim 1, wherein each strip of each layer of working reinforcement is in contact, over at least its radially inner axial face, with a heat transfer element comprising at least one heat-conducting material.

3. The tire according to claim 1, wherein a heat transfer element is made up of at least one substantially circumferential metal band.

4. The tire according to claim 1, wherein a heat transfer element is made up of a single substantially circumferential metal band of which the axial width is equal to the axial width of the strip in contact with the heat transfer element.

5. The tire according to claim 1, wherein a heat transfer element is made up of a plurality of axially juxtaposed substantially circumferential metal bands, of which the sum of the axial widths is at most equal to the axial width of the strip in contact with the heat transfer element.

6. The tire according to claim 1, wherein a heat transfer element is made up of a plurality of axially disjointed substantially circumferential metal bands distributed over the axial width of the strip in contact with the heat transfer element.

7. The tire according to claim 3, wherein a substantially circumferential metal band comprises holes.

8. The tire according to claim 3, wherein a substantially circumferential metal band comprises circular holes.

9. The tire according to claim 3, wherein a substantially circumferential metal band comprises holes of a diameter at most equal to half the width of the band.

10. The tire according to claim 1, wherein a heat-conducting material of a heat transfer element is made of metal.

11. The tire according to claim 1, wherein a heat-conducting material of a heat transfer element is aluminum.

12. The tire according to claim 11, wherein a heat transfer element has a thickness at most equal to 0.1 mm.

13. The tire according to claim 1, wherein any heat transfer element has periodic geometric oscillations in a circumferential plane perpendicular to the axial direction.

\* \* \* \* \*